P. C. HALDEMAN.
TABLE FOR ROLLING MILLS AND OTHER CONVEYERS OF SIMILAR GENERAL CONSTRUCTION.
APPLICATION FILED NOV. 1, 1918.
1,321,303.
Patented Nov. 11, 1919.
3 SHEETS—SHEET 1.
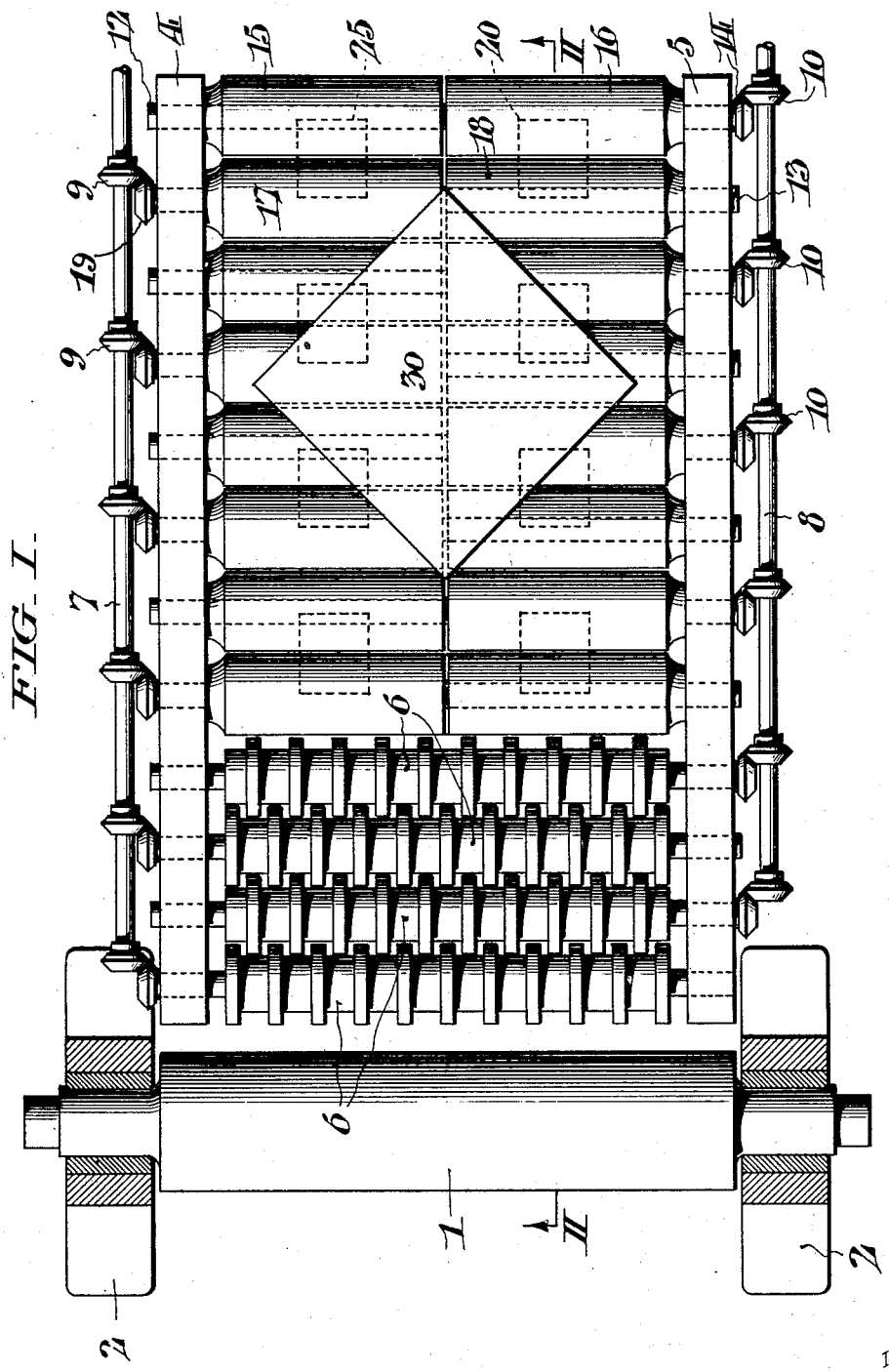
FIG. I.
Witnesses
John C. Bergner.
James H. Bell.
Inventor
Paul C. Haldeman,
By Maley & Paul
Attorneys.

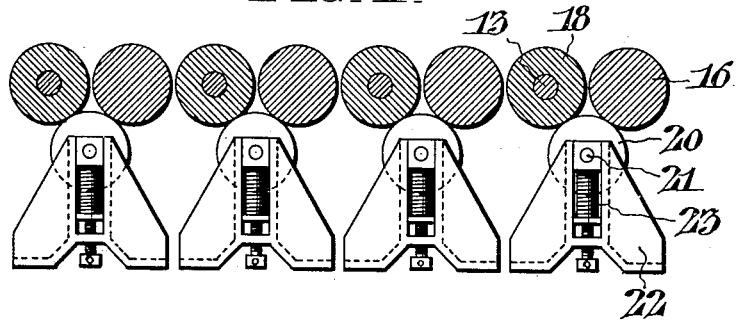
FIG. II.
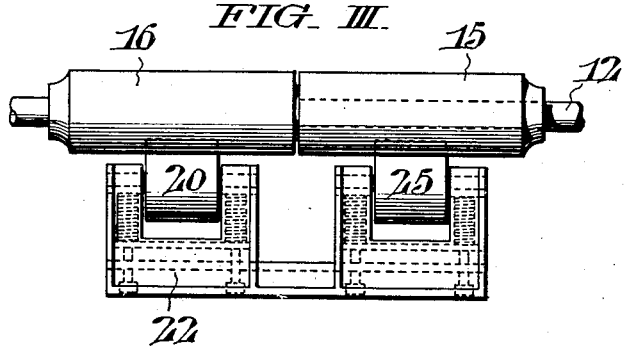
FIG. III.
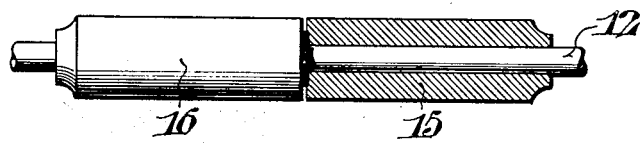
FIG. IV.
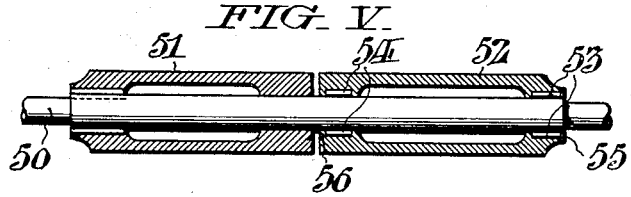
FIG. V.
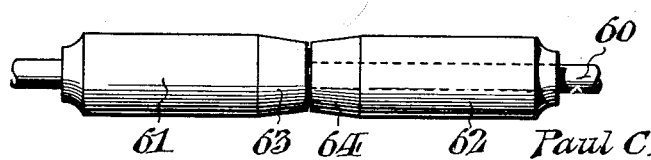
FIG. VI.
Inventor
Paul C. Haldeman, P. C. HALDEMAN.
TABLE FOR ROLLING MILLS AND OTHER CONVEYERS OF SIMILAR GENERAL CONSTRUCTION.
APPLICATION FILED NOV. 1, 1918.
1,321,303. Patented Nov. 11, 1919.
3 SHEETS—SHEET 3.
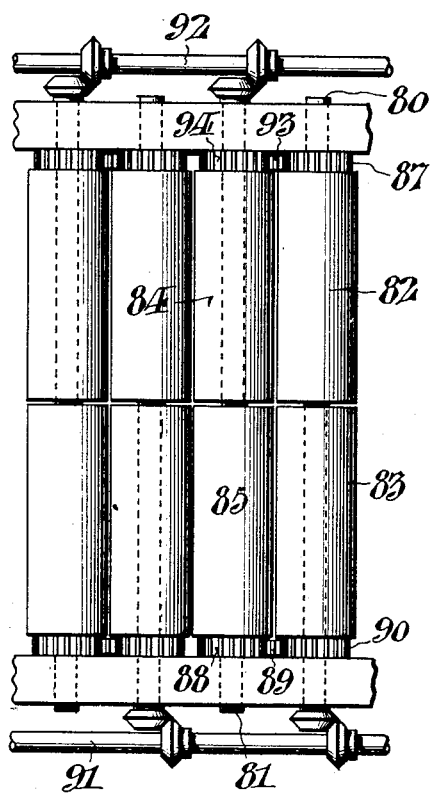
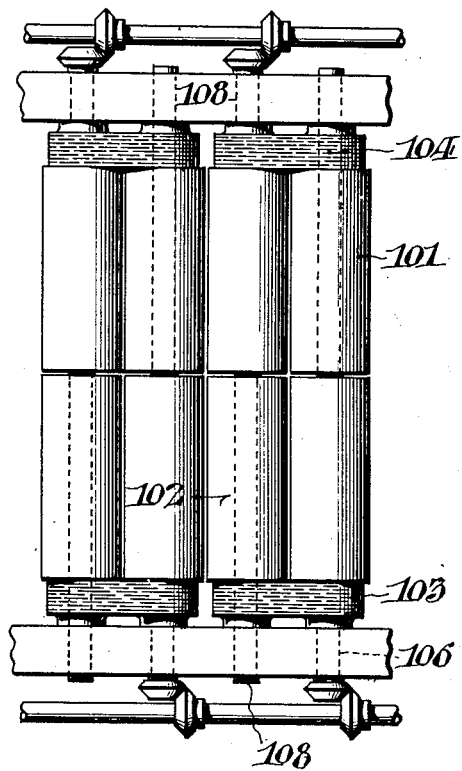
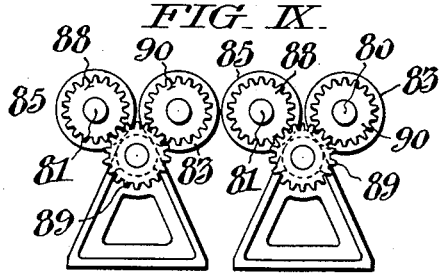
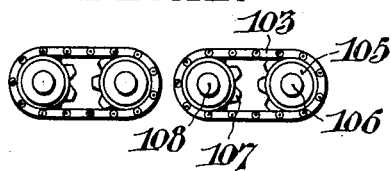
Inventor
Paul C. Haldeman,

UNITED STATES PATENT OFFICE.

PAUL C. HALDEMAN, OF COATESVILLE, PENNSYLVANIA, ASSIGNOR TO LUKENS STEEL COMPANY, OF COATESVILLE, PENNSYLVANIA, A CORPORATION OF PENNSYLVANIA.

TABLE FOR ROLLING-MILLS AND OTHER CONVEYERS OF SIMILAR GENERAL CONSTRUCTION.

1,321,303.   Specification of Letters Patent.   Patented Nov. 11, 1919.

Application filed November 1, 1918. Serial No. 260,761.

*To all whom it may concern:*

Be it known that I, PAUL C. HALDEMAN, a citizen of the United States, and a resident of Coatesville, in the county of Chester and State of Pennsylvania, have invented certain new and useful Improvements in Tables for Rolling-Mills and other Conveyers of Similar General Construction, whereof the following is a specification, reference being had to the accompanying drawings.

Since my invention is particularly adapted for use in handling blooms or plates of material which are to be subjected to the action of a rolling mill, I have selected that embodiment for illustration in said drawings, but it will be understood that the invention may be employed for conveying any kind of material, where it is desired to control the movement of the conveyed object so that it may be turned in either direction during transit, or may be carried without turning.

In the accompanying drawings, Figure I, represents a top or plan view of a rolling mill table embodying my invention in a convenient form.

Fig. II, is a partial longitudinal section thereof, on the line II, II, of Fig. I.

Fig. III, is a partial view, in end elevation, which consequently shows the members constituting one entire transverse rolling element in side elevation.

Fig. IV, is a partial axial section of the members shown in Fig. III.

Figs. V, VI, and VII, represent certain alternative types of rollers, which may be employed.

Figs. VIII, IX, X, and XI, represent certain alternative driving devices which may be employed in connection with any or all of the types of rollers shown.

Referring now particularly to the type of device shown in Figs. I, II, and III, 1, indicates the upper member of the rolling mill train, mounted in housing 2, and driven in any desired manner. 4, and 5, represent the upper longitudinal members of the housing for the working members of the roller table, it being understood that the general construction of the framework, or housing, may be of any desired type. The system may comprise a group of secondary conveying rollers 6, located at a point adjacent to the rolling mill, and between it and that portion of the roller table which comprises the main feeding rollers which constitute the subject matter of my invention.

7, and 8, represent driving shafts running longitudinally with the table and arranged on each side thereof, said shafts being actuated from any convenient source of power, and carrying transmitting gearing, which, in this instance, comprises the bevel gear 9, and 10, respectively. The feeding rollers proper, which embody my invention are (in the embodiment shown in said figures), cylindrical, and are arranged in a series of co-axial pairs, the peripheries being in close proximity to those of the next pair in the series. Each complete roller comprises two roller members, such as 15, and 16, 17, and 18, and an axial shaft, such as 12, and 13, common to both members of a pair.

As will be seen by reference to Fig. I, the line of subdivision of the two members of each pair is practically the longitudinal median line of the table, and as the rollers are duplicates of one another, it is only necessary to describe in detail the pairs, which, in the view of Fig. I, are adjacent to the right hand end of the table. The shaft 12, extends unitarily across the table, being mounted in bearings 4, and 5, and is provided with a bevel gear 14, which meshes with the proximate bevel gear 10, upon the driving shaft 8. Said shaft 12, extends axially through both rollers 15, and 16, but the roller 15, runs free thereon, while the roller 16, is secured thereto by keys, or in any other desired manner. In order to indicate conventionally the organization just referred to, the dotted lines indicating the shaft 12, are carried through the freely mounted roller 15, but are not depicted in connection with the rigidly attached roller 16, which functionally may be considered as integral with the shaft. The members of the next pair of rollers 17, and 18, are similar in construction to those just mentioned, but are arranged conversely; that is to say, the roller 17, which, in the longitudinal series, is adjacent to the roller 15, is rigidly attached to its shaft 13, while the roller 18, which is adjacent, in the longitudinal series, to the roller 16, runs free upon said shaft. The bevel gear 19, upon the shaft 13, is arranged at the side of the table opposite to the bevel gear 14, of the shaft 12, said bevel gear 19, meshing with the gear 9, upon the shaft 7. The remaining pairs of rollers of the train are similar in construction to those just described, and are arranged in the same alternating manner, in the serial relation.

Suspending at this point the structural description, it will be seen that if all of the shafts 12, 13, etc., are driven in the same direction, an object, such as a plate 30, placed upon the table, would be conveyed by the positive action of the rigidly attached rollers 16, and 17, while the freely mounted rollers 15, 18, etc., would operate simply as idlers. In practice, however, it is desirable that these freely mounted rollers should be positively actuated, sometimes in the same direction as the rigidly mounted member upon the same shaft, and sometimes in a direction opposite thereto, as when it is desired to turn the conveyed object during its travel.

I, therefore, provide means whereby each freely mounted roller may be positively actuated from the driving mechanism of a proximate rigidly mounted roller in the longitudinal series. In the embodiment shown in Figs. I, II, and III, the actuating means comprise a friction roller, such as 20, supported in vertically movable bearings 21, in housing uprights 22, the bearing being provided with adjustable springs 23, whereby the roller 20, may be pressed upward into operative contact with the adjacent superposed rigidly mounted and freely mounted rollers, in this instance, 16, and 18, respectively. As above stated, while the shaft 13, of the roller 18, is shown in cross section, the representation of the shaft 12 is omitted from the cross sectional view of Fig. II, in order to indicate conventionally that the roller 16, is functionally integral with its shaft 12.

Since the roller 20, is forcibly held in frictional contact with the rigidly mounted roller 16, and with the freely mounted roller 18, it is obvious that the roller 18, will be frictionally actuated in the same relative rotation as the roller 16.

On the opposite side of the median line a driving device similar to that just described is provided, said device comprising the friction roller 25, arranged in operative contact with the rigidly mounted roller 17, and with the freely mounted roller 15. Hence the roller 15, will be frictionally actuated from the roller 17, and will rotate in the same direction therewith.

Without continuing the description through the entire train of rollers, it will be obvious that since the driving shafts 7, and 8, may be driven in different directions, or in the same direction, all the rollers of the table may be positively rotated in the same direction, or the rollers on one side of the median line may be positively rotated in one direction and those on the other side in the opposite direction so that an object carried thereon may either be conveyed without any other motion than that of translation, or may be turned in either direction while traveling.

Having thus described the essence of my invention, I now desire to point out certain features in which it differs from other devices of the prior art for the same general purpose. In one type of device, the feed table comprises feed rollers arranged in pairs, the line of division being substantially the median line of the table. Each member, however, of the pair is arranged to be directly driven by means of its own bevel gear, and, since, in practical working the roller lying on one side of the median line must be capable of being driven in a direction opposite to that of its co-axial fellow, it is necessary that each of the rollers should be provided with independent bearings, i. e., one located substantially at the median line of the table, the other at the side of the table. In practice, such a construction is found undesirable, because the provision of proper sets of bearings situated at the median line occasions a wide gap between the members of a pair of rollers, and, moreover, said bearings are exposed to high heat from the object carried, so that they are difficult to maintain in a proper condition of lubrication and are liable to warp and become displaced in arrangement.

In another type of table, tapering rollers, or rollers having surfaces of unequal diameter are employed, the theory of action being that an extended object such as a plate, shall practically only be supported upon the high surfaces lying on each side of the median line, this arrangement resulting in an unequal support for the object, where alternatively arranged frusto-conical roller members are employed, or if the rollers be divided longitudinally and be separately driven, central bearings are required as in the case previously stated.

The object of my invention, therefore, is to provide symmetrical co-axial roller pairs, whose members are wholly independent of one another and which may be individually operated by positive driving mechanism, while at the same time obviating the necessity for any bearings, or housings at the region adjacent to the median line of the table.

Furthermore, it will be noted that in cases where the conveyed object is of such character that it can be advantageously controlled merely by alternate roller action, on opposite sides of the median line of the table, the frictional driving devices, or their equivalents may be dispensed with, the freely mounted members then operating merely as supporting idlers.

With this preface the modification shown in the remaining views will be readily understood. Thus, in Fig. V, the pair of co-axial rollers comprises cylindrical members which are, in this instance, represented as hollow, the member 51, being keyed fast to the shaft 50, while the member 52, is freely mounted upon said shaft by means of a plurality of friction rollers 53, and 54, supported in cavities adjacent to the extremities of said rollers 52, the friction rollers being held in position by annular plates 55, and 56.

In the form of the device shown in Fig. VI, the rollers 61, and 62, have slightly tapered, or frusto-conical portions 63, and 64, at their adjacent ends, and are supported upon the shaft 60 in the same general manner, as is the case with the type of roller shown in Fig. IV. In Fig. VII, each member of the pair of rollers 71, and 72, is wholly frusto-conical and they are respectively attached, to, or freely supported upon, the shaft 70, in the manner hereinbefore described.

Figs. VIII, and IX, indicate respectively, in plan view and partial end elevation, a group of rollers similar to those shown in Fig. I, but provided with an alternate form of driving device. Here the shaft 81, carries a rigidly attached gear 88, which, through the intermediate pinion 89, drives a gear 90, rigidly attached to the end of the roller 83, which is freely mounted upon the shaft 80, the roller 82, being rigidly connected to said shaft 80. So also the shaft 80, carries a rigidly attached gear 87, which, through the medium of the pinion 93, drives the gear 94, rigidly attached to the end of the freely mounted roller 84. The respective shafts 80, and 81, are, in this instance, shown as driven by bevel gears from the main driving shafts 91, and 92.

In the arrangement shown in Figs. X, and XI, the rollers are of the same type as those shown in Figs. VIII, and IX, but the driving of the freely mounted members 101, and 102, is effected by means of endless chains such as 103, and 104, the chain 103, being positively driven by a sprocket wheel 105, rigidly attached to the shaft 106, and co-operating with the sprocket wheel 107, rigidly attached to the end of the freely mounted roller 102. A similar arrangement, but operating in the inverse direction, is provided for the driving of the freely mounted roller 101, from the shaft 108, by means of the endless chain 104.

As above stated, I recognize the state of the prior art as embodied in such devices as those specifically described, and do not claim broadly the employment of feeding rollers arranged in co-axial pairs, the members of each pair being independent of one another.

Furthermore, I desire to state that while for the convenience of construction, it is preferable to extend the shaft axially through both rollers and to key to it the roller which is directly driven thereby, so that said roller is functionally integral with the shaft, I do not intend to exclude a construction wherein part of the shaft is actually integral with the roller member, intended to be directly driven thereby.

I claim:

1. In a conveying table, the combination of a plurality of co-axial roller-pairs, arranged in serial relation; one member of each pair being freely mounted with relation to the common axis; the other member being rigid with relation to said axis; the freely mounted members and rigid members alternating at the respective sides of the median line of the table; and driving mechanism for said rigid members.

2. In a conveying table, the combination of a plurality of co-axial roller-pairs, arranged in serial relation; one member of each pair being freely mounted with relation to the common axis; the other member being rigid with relation to said axis; the freely mounted members and rigid members alternating at the respective sides of the median line of the table; and means whereby each freely mounted member may be actuated from the driving mechanism of a rigid member adjacent to it in the longitudinal series, and in the same rotative direction therewith.

3. In a conveying table, the combination of a plurality of roller-shafts, each extending unitarily across the table structure, and arranged in serial relation; a pair of roller members upon each shaft, one member being freely mounted thereon, the other member being rigidly connected to said shaft, said freely mounted members and rigidly mounted members alternating at the respective sides of the median line of the table; and driving mechanism for said shafts.

4. In a conveying table, the combination of a plurality of roller-shafts, each extending unitarily across the table structure, and arranged in serial relation; a pair of roller members upon each shaft, one member being freely mounted thereon, the other member being rigidly connected to said shaft, said freely mounted members and rigidly mounted members alternating at the respective sides of the median line of the table; and means whereby each freely mounted member may be actuated from the driving mechanism of a rigid roller adjacent to it in the longitudinal series and in the same direction therewith.

5. In a conveying table, the combination of a plurality of roller shafts, each extending unitarily across the table structure, and arranged in serial relation, a pair of roller members upon each shaft, one member being freely mounted thereon, the other member being rigidly connected to said shaft, said freely mounted members and rigidly mounted members alternating at the respective sides of the median line of the table, and a frictional driving member arranged in operative relation to a rigidly mounted roller, and to a freely mounted roller adjacent thereto in the longitudinal series.

In testimony whereof, I have hereunto signed my name, at Philadelphia, Pennsylvania, this sixteenth day of October, 1918.

PAUL C. HALDEMAN.

Witnesses:
 JAMES H. BELL,
 E. L. FULLERTON.